Oct. 6, 1964

D. E. GUFFY 3,151,739

THERMOMETER HOLDER

Filed April 16, 1962

INVENTOR.
DAVID E. GUFFY
BY
Horace B. Van Valkenburgh
ATTORNEY

Oct. 6, 1964     D. E. GUFFY     3,151,739
THERMOMETER HOLDER
Filed April 16, 1962     3 Sheets-Sheet 2

INVENTOR.
DAVID E. GUFFY
BY
Horace B. Van Valkenburgh
ATTORNEY

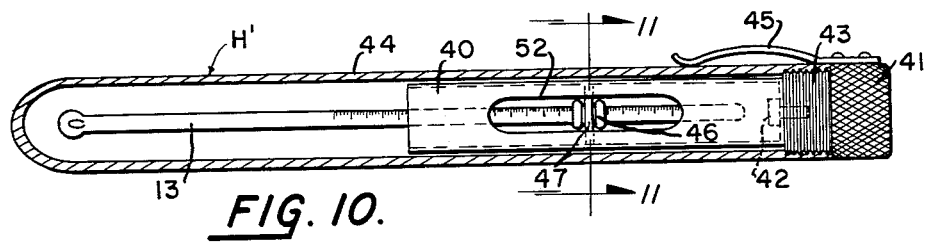
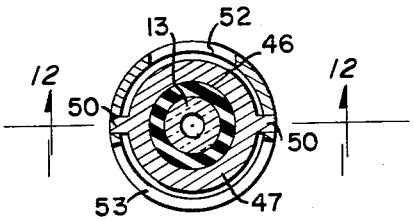
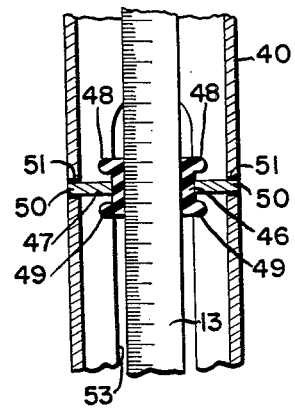
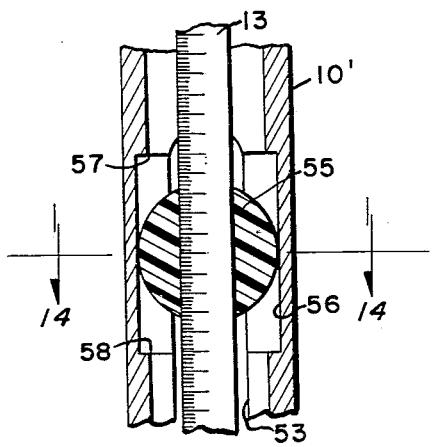
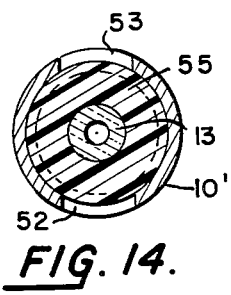

United States Patent Office 3,151,739
Patented Oct. 6, 1964

3,151,739
THERMOMETER HOLDER
David E. Guffy, 385 Martin Drive, Boulder, Colo.
Filed Apr. 16, 1962, Ser. No. 187,547
9 Claims. (Cl. 206—16.5)

The present invention relates to a thermometer holder and more particularly to a holder for a rectal thermometer for animals.

Many types of thermometers and holders for thermometers have been used when taking the temperature of animals, but each of these has certain inherent disadvantages. The conventional rectal thermometer is easily discharged from the rectum of the animal onto the ground, becoming lost in the straw and other matter therearound, making it quite difficult to find. Also, a thermometer thus discharged quite easily may be stepped on by either the animal or the person taking the temperature, generally resulting in breakage of the thermometer. Also, conventional rectal thermometers are often sucked into the bowels of the animal, necessitating the unpleasant task of reaching into the animal and searching for the thermometer. This problem is graphically illustrated on page 43, volume 41, No. 2, of Modern Veterinary Practice, January 15, 1960. To prevent the thermometer from either being sucked into the animal or discharged onto the ground, it is usually necessary for the person taking the animal's temperature to hold the thermometer in place for the required period of time, in which case he suffers the possibility of being kicked and severely injured. Modern Veterinary Practice also recognized this danger on page 49 of volume 41, No. 2, January 15, 1960.

Among the objects of this invention are to provide a thermometer holder for use with a conventional animal rectal thermometer; to provide such a thermometer holder which is easy to use; to provide such a thermometer holder which is durable; to provide such a thermometer holder which protects the thermometer from breakage when not in use; to provide such a thermometer holder which will prevent the thermometer from being sucked into the bowels of the animal; to provide such a thermometer holder which will prevent the thermometer from being discharged from the animal; to provide such a thermometer holder which prevents loss or breakage of the thermometer during use; to provide a thermometer holder which, in one embodiment, may be easily carried, as in a shirt pocket, when not in use; and to provide such a thermometer holder which eliminates the necessity for the person taking the animal's temperature to hold the thermometer in place.

Additional objects and the novel features of this invention will become apparent from the description which follows, taken in conjunction with the accompanying drawings, in which:

FIG. 10 is an enlarged longitudinal section similar to FIG. 4, but showing an alternative thermometer holder with the thermometer in storage position;

FIG. 11 is an enlarged vertical section, taken along line 11—11 of FIG. 10 but with a cap removed, showing details of a thermometer holding ring and pivot arrangement;

FIG. 12 is a partial longitudinal section taken along line 12—12 of FIG. 11, showing additional details of the thermometer holding ring and pivot arrangement.

FIG. 13 is a partial longitudinal section, similar to FIG. 12, but showing a further embodiment; and FIG. 14 is a cross section taken along line 14—14 of FIG. 13.

Figure 1:
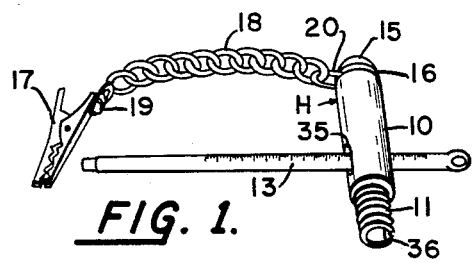
FIG. 1 is a perspective view of a thermometer holder of this invention, with the thermometer in operative position for use.
Figure 2:
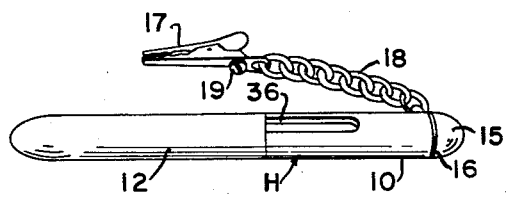
FIG. 2 is a perspective view of the thermometer holder of FIG. 1, with the thermometer in storage position.
Figure 3:
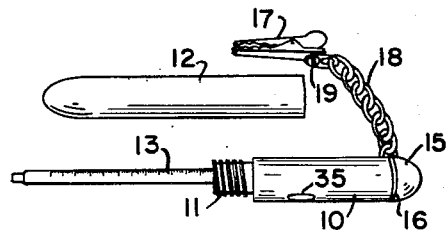
FIG. 3 is a perspective view of a thermometer holder, similar to FIG. 2, but with a cover removed.

The thermometer holder H of FIGS. 1–4, constructed in accordance with this invention, comprises a tubular barrel 10 conveniently made of metal or a suitable plastic and having reduced external threads 11 at one end, adapted to engage internal threads at the open end of a tubular cap 12, which covers the thermometer 13 when in storage position. The cap is conveniently formed of the same material as the barrel and is removed during use of the thermometer. A recess 14 is provided in the opposite end of barrel 10 for receiving a plug 15 by which a ring 16 is secured. As shown in FIGS. 1–3, a spring biased clip 17 is connected to the barrel 10 by means of a link chain 18, the outer link of which is attached to clip 17, as by a screw 19, with the inner link of the chain attached to a bracket 20 which extends from ring 16. When the thermometer is not in use, the spring clip 17 may be attached to the pocket to prevent loss of the thermometer.

Figure 9:
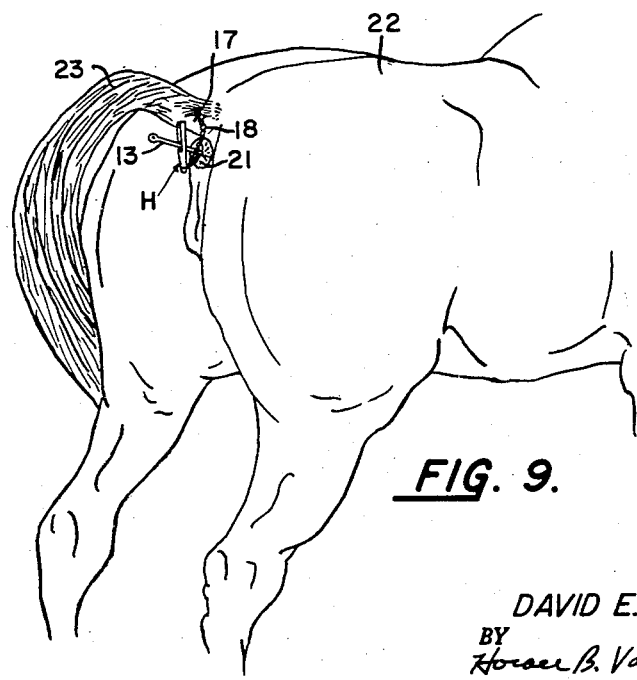
FIG. 9 is a partial rear perspective view of a horse, illustrating the manner in which the thermometer holder holds the thermometer in the animal's rectum.

When the thermometer is in use, as shown in FIG. 9, the thermometer 13 is disposed transversely of barrel 10, as in FIG. 1, and is inserted in the rectum 21 of the animal, such as a horse 22, while the spring clip 17 is attached to some of the hairs of the animal's tail 23, to prevent the thermometer from falling on the ground, should it be discharged from the animal's rectum, thus preventing possible loss and/or breakage. The holder H and particularly barrel 10 thereof, being disposed transversely to thermometer 13, prevents the thermometer from being sucked into the animal's bowels, thus eliminating any disagreeable search for the thermometer in the animal's bowels. Furthermore, since the thermometer is prevented from being sucked into the animal or discharged therefrom, it is unnecessary for the person taking the animal's temperature to hold the thermometer in place, thereby reducing the possibility of injury through kicking or the like.

Figure 4:
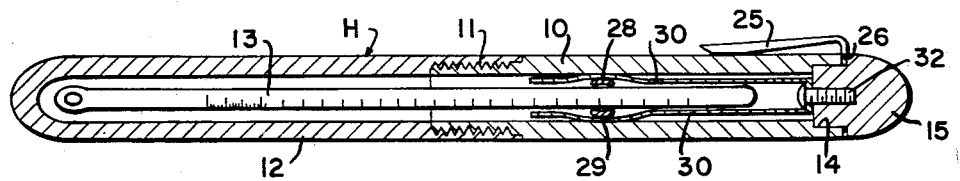
FIG. 4 is an enlarged longitudinal section of the thermometer holder of FIG. 1 in the storage position of FIG. 2, but provided with an alternative clip.

As shown in FIG. 4, a spring clip 25 mounted on a ring 26, similar to spring clips used on fountain pens, may be substituted for clip 17 and chain 18, ring 26 being clamped between plug 15 and barrel 10 in the same manner as ring 16. Thus, the thermometer of this embodiment may be carried in the pocket in the manner of a fountain pen when not in use, and the clip 25 may be attached, during use, to the hairs of the animal's tail to prevent the thermometer from being discharged from the animal's rectum when in use.

Figure 5:
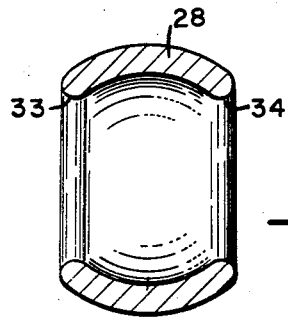
FIG. 5 is an enlarged longitudinal section of a thermometer holding ring of the thermometer holder of FIG. 4.

As also shown in FIG. 4, the thermometer 13 is engaged by a holding ring 28, which is pivotally mounted in an arcuate depression 29 near the outer ends of each of a pair of parallel but opposed arcuate fingers 30 which extend longitudinally within barrel 10. Fingers 30 are conveniently integral parts of a bracket formed of resilient metal, such as spring brass, and having a head 31 which is attached to plug 15 by a screw 32. The fingers 30 are resiliently biased toward each other with sufficient force to hold ring 28 in place, but permit rotational movement of the ring and thermometer, as will hereinafter appear. Also because of the resilient material of which it is made and the concave cross section of the holding ring 28, as more clearly shown in FIG. 5, the thermometer is gripped only at two spaced circuit positions 33 and 34, reducing the friction therebetween so that the thermometer may be easily slid back and forth, but at the same time will be held in any adjusted position.

Figure 6:
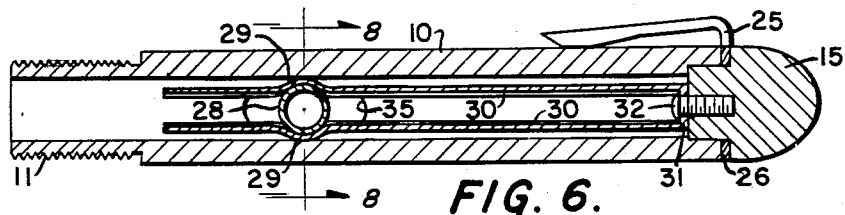
FIG. 6 is a further enlarged, longitudinal section, similar to FIG. 4, with parts in position for use similar to FIG. 1, but without the thermometer, for clarity of illustration.
Figure 7:
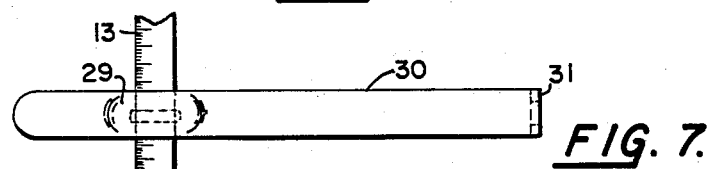
FIG. 7 is a top plan view of a bracket of FIG. 6, with the thermometer in operative position.
Figure 8:
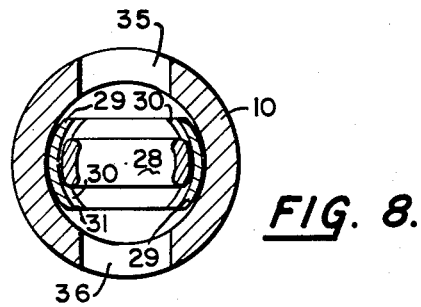
FIG. 8 is an enlarged cross section taken along the line 8—8 of FIG. 6, showing details of the thermometer holding ring and pivot arrangement.

When it is desired to use the thermometer, it is merely necessary to remove cap 12 and slide the thermometer 13 outwardly through holding ring 28 until the lower or use end of the thermometer clears the top of a longitudinal slot 35, shown in FIGS. 1 and 3 and opposite holding ring 28, as in FIG. 6. Then, the thermometer and holding ring are pivoted or turned, as in FIGS. 6 and 7, so that the end of the thermometer projects into slot 35 and the body of the thermometer is pivoted into a longitudinal slit 36, which is diametrically opposite slot 35, as shown in FIGS. 1, 2 and 8, and extends to the end of barrel 10. The holding ring 28 will then be in the position shown in FIG. 8, from which the ability of ring 28 to be turned in the arcuate, concave depressions 29 of fingers 30 will be evident. Next, the thermometer is pushed in the opposite direction through ring 28, so that the lower end thereof extends through slot 35, as shown in FIG. 1. The thermometer may be pushed through the slot any distance desired, but should be adjusted with respect to the size of the animal whose temperature is to be taken. Because of the arcuate shape of fingers 30 and the depressions 29 therein, the holding ring 28 is held securely in place when the thermometer is in operative position, as clearly seen in FIG. 8. On the other hand, when the thermometer is returned to a storage position, as in FIG. 4, ring 28 is also held securely in place within arcuate depressions 29. Thus, the depressions, together with the arcuate shape of the fingers, securely hold the ring and thermometer in either the storage position of FIG. 4 or the operative position of FIG. 1.

After the thermometer 13 is moved to the position of FIG. 1, as described, it may be inserted in the rectum 21 of an animal, such as the horse 22 shown in FIG. 9, and the clip 17 attached to some of the hairs of the horse's tail 23. The barrel 10, which is now perpendicular to the thermometer, prevents the thermometer from being sucked into the bowels of the animals, as described previously. If the clip 17 can be attached close enough to the base of the tail and the chain 18 is not too long, the animal will be unable to discharge the thermometer. In this case, it may be left in place for a sufficient length of time to obtain an accurate temperature reading. Thus, it is not necessary for the person taking the animal's temperature to continually hold the thermometer in place and run the risk of being kicked and possibly injured. If the clip cannot be attached close to the base of the tail, such as when the animal has no hair at this point which is long enough to be engaged by the clip, it can be attached further down the tail. In this case, the clip may not prevent the animal from discharging the thermometer, but will prevent the thermometer from falling to the ground and becoming lost in debris, or damage by the fall or stepped on by either the animal or the person taking the animal's temperature.

To return the thermometer to storage position, it is merely necessary to pull the thermometer outwardly through the holding ring 28 until the lower end thereof clears the inside of slot 35. Then, the thermometer is again rotated through slit 36, pushed upwardly in the barrel to the position shown in FIG. 4, and the cap 12 is replaced. It will be noted that resilient fingers 30 holding ring 28 support the thermometer in storage position so that it does not touch the walls of the barrel or cap. This arrangement protects the thermometer from possible breakage, should the holder be dropped. Also, the resiliency of arms 30 serves to dampen shock forces as they are transmitted from the holder to the thermometer, if the holder is dropped or roughly handled.

In the alternative embodiment of FIGS. 19–12, a thermometer holder H' includes a cylindrical metal barrel 40, the closed upper end of which is attached to a top 41 by a screw 42. Top 41 has a threaded neck 43 for removable engagement with a tubular cap 44, which is adapted to slide over barrel 40 and threadably engage neck 43 to protect the thermometer when not in use. A clip 45 is attached to one side of top 41, to attach the holder H' to a shirt pocket for carrying, or to the hairs on an animal's tail when in use. The thermometer 13 is held within a resilient holding ring 46, conveniently formed of plastic and mounted on a pivot yoke 47 within barrel 40. The holding ring 46, as in FIG. 12, has a pair of spaced peripheral flanges 48 and 49, which hold it in place in pivot yoke 47, while the pivot yoke 47, as in FIGS. 11 and 12, has a pair of pivot pins 50 extending outwardly at diametrically opposite points for engagement with pivot holes 51 in the wall of barrel 40. The wall of barrel 40 is provided with a longitudinal slot 52, in a plane perpendicular to the plane of holes 51, and a longitudinal cutaway portion 53, diametrically opposite slot 52 and extending to the lower end of the barrel. Slot 52 and cutaway portion 53 are substantially identical in function to slot 35 and slit 36, respectively, of the previous embodiment.

When it is desired to use the thermometer in holder H', it is merely necessary to remove cap 44 and pull thermometer 13 outwardly through resilient holding ring 46, until the lower end of the thermometer clears the end of slot 52, whereupon the thermometer is pivoted through cutaway portion 53, by means of pivot pins 50, so that the end thereof projects through slot 52. Finally, the thermometer is pushed in the opposite direction through the holding ring 46, until the thermometer is in the position desired for use. The resilient holding ring holds the thermometer securely while permitting longitudinal adjustment of the thermometer to any desired position. The thermometer is then used in the same manner as with holder H of the previous embodiment, it being understood that the clip 45 may be replaced with a clip on a chain, such as shown in FIG. 1, if desired. To return the thermometer to storage position, it is merely necessary to pull the thermometer outwardly until the end of the thermometer again clears the end of slot 52, pivot the thermometer about pivot pins 51 and through cutaway portion 53, and then push the thermometer inwardly to the position shown in FIG. 10, after which cap 44 may be replaced.

In the further embodiment shown in FIGS. 13 and 14, a ring 55 formed of plastic such as Teflon is generally spherical and provided with a central hole engaging the thermometer 13, which can be slipped inwardly and outwardly in the ring but tends to be retained in any position in which placed. Ring 55 is movable in an annular groove 56 formed on the inside of a barrel 10', which may be otherwise similar to barrel 10 of FIGS. 1–4 or sleeve 40 of FIGS. 10–12, between shoulders 57 and 58. As before, sleeve 10' is provided with a slit 53 through which the thermometer may be pivoted and a slot 52 through which the end of the thermometer may be extended or retracted. The fit between ring 55 and the thermometer is preferably such that the ring grips the thermometer, but the thermometer may be pulled or pushed through the ring. For assembly, ring 55 may be compressed and inserted without the thermometer until the ring reaches groove 56, then the thermometer inserted in the ring. In each embodiment, the thermometer 13 is suspended by a holding ring in such a manner that the thermometer does not touch the wall of the barrel, as shown in FIG. 10. Thus, the possibility of breakage is substantially eliminated, should the holder be dropped or handled roughly.

Also, the resilient holding ring serves to damper the shock transmitted from the holder to the thermometer.

From the foregoing, it will be evident that a thermometer holder constructed in accordance with this invention fulfills to a marked degree the requirements and objects hereinbefore set forth. The holder is both durable and easy to use and prevents damage to the thermometer when in storage position. Furthermore, the thermometer holder is provided with a clip which serves the dual function of preventing loss of the thermometer when carried in the pocket and of attachment to the hairs of the animal's tail when taking the animal's temperature, thereby preventing loss or damage to the thermometer. The thermometer is prevented from being sucked into the bowels of the animal by the barrel, which is perpendicular to the thermometer when in use. Also, the clip is attached to hairs on the animal's tail, which prevents the animal from discharging the thermometer, if it can be clipped close to the base of the animal's tail. If this is not possible, the clip will still prevent the thermometer from falling to the ground, where it may be lost or damaged. Therefore, it is not necessary for one taking an animal's temperature to hold the thermometer manually in place, thus running the risk of being kicked and possibly injured by the animal, but rather the thermometer may be inserted in the animal's rectum and attached to its tail, as shown in FIG. 9, until a sufficient time has elapsed to obtain an accurate temperature reading, whereupon one may merely return to the animal, remove the clip from the tail and remove the thermometer. After the temperature has been read, the thermometer may be replaced in the holder, as described above, and returned to a pocket.

Although preferred embodiments of this invention have been illustrated and described, it will be understood that other embodiments may exist and various changes and variations made, without departing from the spirit and scope of this invention.

What is claimed is:

1. A thermometer holder for use with a thermometer for taking the rectal temperature of animals, including a barrel having a slit extending longitudinally from one end of said barrel and an opening in said barrel diametrically opposite said slit; and means pivoted within said barrel for holding said thermometer at either a position within said barrel or at a position substantially perpendicular to said barrel wherein one end of said thermometer extends through said slit and the other end extends through said opening, so that said thermometer cannot be sucked into the bowels of said animal when its temperature is being taken.

2. A thermometer holder as set forth in claim 1, wherein said opening comprises a longitudinal slot in the wall of said barrel.

3. A thermometer holder as set forth in claim 1, wherein said pivot means comprises a plastic ring having a central hole through which said thermometer extends; and said barrel is provided with an annular interior groove between spaced shoulders, said ring being movable in said groove.

4. A thermometer holder as set forth in claim 2, in which said slot is located intermediate the ends of said barrel; and said pivot means includes a holding ring within said barrel for slidably holding said thermometer in any longitudinally adjusted position, so that said thermometer may be slid outwardly of said barrel in said holding ring until the end thereof may be pivoted through said slit and then be pushed through said slot to a position for use.

5. A thermometer holder as set forth in claim 4, wherein said holding ring is arcuate in cross section and transversely concave on the inside.

6. A thermometer holder as set forth in claim 4, in which said pivot means includes a pair of arcuate resilient fingers extending longitudinally within said barrel and attached thereto, each said finger having a generally arcuate depression adjacent the outer end thereof, said holding ring being mounted within said depressions and being adapted to pivot within said depressions.

7. A thermometer holder as set forth in claim 6, in which said fingers are joined at one end to provide a generally U-shaped configuration; and means attaching said fingers to the inner end of said barrel.

8. A thermometer holder for use with a thermometer for taking the rectal temperature of animals, including a barrel; a longitudinal slot in the wall of said barrel; a cutaway portion in said wall diametrically opposite said slot and extending to the end of said barrel; a pivot yoke within said barrel having a pair of pivot pins extending outwardly from opposite sides thereof and pivotally mounted in apertures in said barrel, said apertures lying in a plane perpendicular to the plane of said slot and said cutaway portion; and a holding ring within said pivot yoke for frictionally engaging said thermometer to hold said thermometer in slidable adjusted position, so that said thermometer may be slid outwardly of said barrel until the end thereof clears the end of said slot and then pivoted in said pivot yoke through said cutaway portion so that said end extends through said slot, then pushed through said slot to an operative position.

9. A thermometer holder as set forth in claim 8, including spaced peripheral flanges on said holding ring for securing said holding ring within said pivot yoke.

References Cited in the file of this patent

UNITED STATES PATENTS

| | | |
|---|---|---|
| 875,742 | Schneider | Jan. 7, 1908 |
| 1,501,801 | Nurnberg | July 15, 1924 |
| 2,945,696 | Johanningmeier | July 19, 1960 |

FOREIGN PATENTS

| | | |
|---|---|---|
| 229,878 | Switzerland | Feb. 16, 1944 |
| 373,672 | Germany | Apr. 14, 1923 |

UNITED STATES PATENT OFFICE
CERTIFICATE OF CORRECTION

Patent No. 3,151,739                                               October 6, 1964

David E. Guffy

It is hereby certified that error appears in the above numbered patent requiring correction and that the said Letters Patent should read as corrected below.

Column 3, line 7, for "circuit" read -- circular --; column 4, line 4, for "FIGS. 19-12" read -- FIGS. 10-12 --; column 5, line 1, for "damper" read -- dampen --; column 6, line 4, for the claim reference numeral "2" read -- 1 --.

Signed and sealed this 9th day of February 1965.

SEAL)
Attest:

ERNEST W. SWIDER                                    EDWARD J. BRENNER
Attesting Officer                                            Commissioner of Patents